United States Patent
Gifford

(10) Patent No.: US 6,400,285 B1
(45) Date of Patent: Jun. 4, 2002

(54) ERGONOMIC KEYBOARD

(76) Inventor: Henry Gifford, 230 Riverside Dr. #11C, New York, NY (US) 10025-6172

(*) Notice: Subject to any disclaimer, the term of this patent is extended or adjusted under 35 U.S.C. 154(b) by 0 days.

(21) Appl. No.: 07/957,990

(22) Filed: Oct. 8, 1992

(51) Int. Cl.⁷ .............................................. H03K 17/94
(52) U.S. Cl. ........................ 341/22; 341/34; 345/168; 345/169; 400/491.3; 400/704
(58) Field of Search .............. 341/20, 21, 22, 341/27, 34; 400/481, 491, 491.1, 491.3, 715, 704, 712; 340/665, 529, 573; 345/168, 169; 73/862.627, 862.628; 128/782, 774

(56) References Cited

U.S. PATENT DOCUMENTS

| | | | | |
|---|---|---|---|---|
| 3,612,240 A | * | 10/1971 | Parker ........................ | 341/34 X |
| 4,313,113 A | | 1/1982 | Thornburg .................. | 340/709 |
| 4,362,408 A | * | 12/1982 | Cordes et al. ............. | 341/27 X |
| 4,449,763 A | * | 5/1984 | Barnett ..................... | 400/714 X |
| 4,647,916 A | | 3/1987 | Boughton ................... | 340/724 |
| 4,795,888 A | | 1/1989 | MacFarlane ................ | 235/145 |
| 4,918,560 A | | 4/1990 | Storer ........................ | 361/190 |
| 5,004,196 A | | 4/1991 | Gross ......................... | 248/118 |
| 5,056,057 A | * | 10/1991 | Johnson et al. ............ | 341/22 X |
| 5,189,390 A | * | 2/1993 | Fagard ....................... | 341/22 X |
| 5,212,473 A | * | 5/1993 | Louis ......................... | 341/22 X |
| 5,252,971 A | * | 10/1993 | Franz et al. ............... | 341/34 X |
| 5,269,004 A | * | 12/1993 | Comerford et al. ........ | 341/22 X |
| 5,305,238 A | * | 4/1994 | Starr, III et al. ........... | 364/569 |
| 5,311,210 A | * | 5/1994 | O'Brien et al. ............. | 345/168 |

FOREIGN PATENT DOCUMENTS

| | | | | |
|---|---|---|---|---|
| GB | 1330742 | * | 9/1973 | ................. 341/34 |
| GB | 2039394 | * | 8/1980 | ................. 345/169 |
| GB | 2180342 | * | 3/1987 | ................. 341/34 |

OTHER PUBLICATIONS

"The Human Factor in Computers", IBM Tech. Discl. Bull., vol. 30, No. 1, Jun. 1987.*
IBM Technical Disclosure Bulletin, vol. 31, No. 12 May 1989, pp. 367–370.*
Rempel, D. and Gerson, J., Fingertip Forces While Using Three Different Keyboards, Proceedings of the Human Factors Society 35th Annual Meeting, 1991, pp. 253–255.
Alters, D., A Growing Pain in the Workplace, The Star Tribune (Minneapolis), Sunday, Mar. 8, 1992.
Advertisement for the "Wrist Perch," the "Lap Cat," and the "Foot Turtle," products of PC Compatibles, Inc., May 15, 1991.
Advertisement for the "Wrist Perch" and the "Lap Cat," products of PC Compatibles, Inc., date unknown.

* cited by examiner

Primary Examiner—Thomas Mullen
(74) Attorney, Agent, or Firm—Oppedahl & Larson LLP

(57) ABSTRACT

A keyboard system is provided for use in data entry. The keyboard generates signals indicative of key closures, and also generates signals indicative of the pressure with which the user has pressed the keys. If the pressure exceeds a threshold, such as 200 grams, for a pressures averaged over a predetermined interval, such as three minutes, then this event is annunciated. In a single-user environment the annunciation is to the user. In a multi-user environment the annunciation is to a system manager. Optionally wrist support pads are also provided in front of the keyboard, each of which is equipped with a pressure sensor. The system monitors the wrist pad pressure readings to detect unfavorable combinations of wrist pad pressure and key depressions. The support pad may be shaped with a hole through which the operator places the hand, which is thus useful for teaching proper technique and assisting a user in avoiding injury.

40 Claims, 6 Drawing Sheets

ERGONOMIC KEYBOARD

The invention relates generally to keyboards for use in providing data input to computer systems, and relates particularly to keyboards generating pressure information permitting the computer system to warn the user if too much key pressure is being employed.

BACKGROUND OF THE INVENTION

Much attention has been paid in recent years to carpal tunnel syndrome, tendonitis, and repetitive motion syndrome, terms used to describe the unhappy results often observed when one has been typing too much under poor conditions or with poor typing habits.

Approaches to this problem have included pads, chairs, desks, and supports intended to change the geometry of the hand-keyboard interaction. None has yet proven completely satisfactory.

It has been shown (Rempel et al., Fingertip Forces While Using Three Different Keyboards, Proceedings of the Human Factors Society 35th Annual Meeting, 1991) that with appropriate feedback, typists can alter the fingertip forces applied, and it has been speculated that this may reduce the abovementioned risks.

U.S. Pat. No. 4,795,888 to MacFarlane discusses changing the key pressure required to accomplish key closures by means of a variable pressure bladder. U.S. Pat. No. 4,918,560 to Storer discusses pairs of switches used in industrial settings where both switches must be actuated, thus protecting the hands from harm; the pressure required to operate the switches is selected so as to reduce the likelihood of carpal tunnel syndrome. U.S. Pat. No. 5,004,196 to Gross shows adjustable pad supports designed to minimize unsupported arm and wrist movements at a keyboard so as to reduce the likelihood of carpal tunnel syndrome.

U.S. Pat. No. 4,313,113 to Thornburg shows a keyboard with keys having individual pressure sensors. U.S. Pat. No. 4,647,916 to Boughton shows a keyboard with a variable pressure input. None of these references shows use of pressure information relating to carpal tunnel syndrome.

There is thus a need for a system that will provide feedback to the user of a keyboard or to co-workers of the user to permit the user to modify typing habits in favor of a key pressure consistently below a threshold chosen to minimize harm and to otherwise benefit the user.

SUMMARY OF THE INVENTION

A keyboard system is provided for use in data entry. The keyboard generates signals indicative of key closures, and also generates signals indicative of the pressure with which the user has pressed the keys. If the pressure exceeds a threshold, such as 200 grams, for a pressures averaged over a predetermined interval, such as three minutes, then this event is annunciated. In a single-user environment the annunciation is to the user. In a multi-user environment the annunciation is to a system manager.

Some investigators have suggested that appropriate limits on key pressure be 180 or 190 grams, or 300 grams, depending on the application and particular keyboard design.

In another embodiment of the invention, the system detects and annunciates the event of any single keystroke being made at a level higher than a predetermined threshold.

Alternatively, the system is set up to define distinct physical regions of the keyboard, and compiles key pressure information with respect to the regions. In the event that there has been too much pressure over a predetermined interval with respect to a region, that event is annunciated. The defined regions may, for example, be divided according to which hand is used or according to which finger is used. In keyboards having a separate numeric keypad, the system may compile information separately with respect to characters typed at the numeric keypad. The system may also be set up to compile key pressure information with respect to characteristics of characters being typed. For example, information may be compiled regarding all capital (upper-case) letters typed, or regarding all numerals typed. In all these cases under program control it is possible to annunciate events such as the use of excessive pressure, or to maintain statistics for use in evaluating the progress of a user in modifying his or her typing habits.

Optionally wrist support pads are also provided in front of the keyboard, each of which is equipped with a pressure sensor. The system monitors the wrist pad pressure readings to detect unfavorable combinations of wrist pad pressure and key depressions. The support pad may be shaped with a hole through which the operator places the hand, which is thus useful for teaching proper technique and assisting a user in avoiding injury.

DESCRIPTION OF THE DRAWING

The invention will be described with respect to a drawing, of which.

Where possible, like elements have been shown with like reference numerals.

DETAILED DESCRIPTION OF EXEMPLARY EMBODIMENTS

Figure 1:
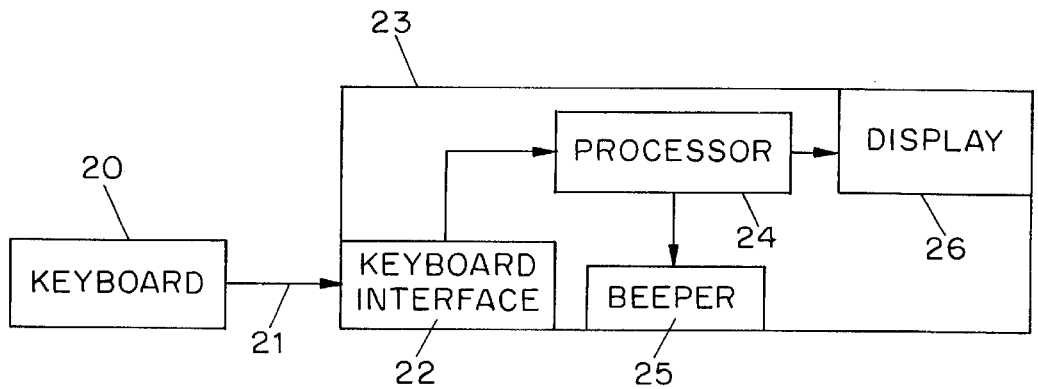
FIG. 1 is a functional block diagram of a keyboard 20 and computer system according to the prior art.
Figure 2:
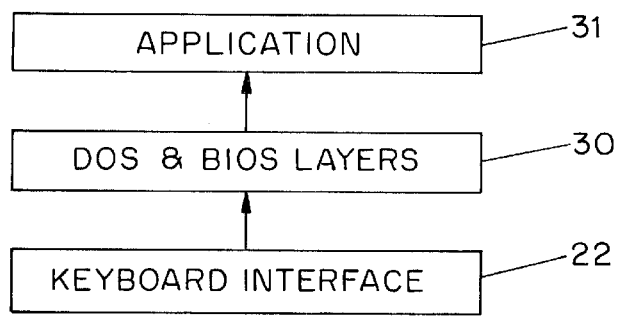
FIG. 2 is a data flow diagram showing the flow of keystroke information in the prior art system of FIG. 1.
Figure 3:
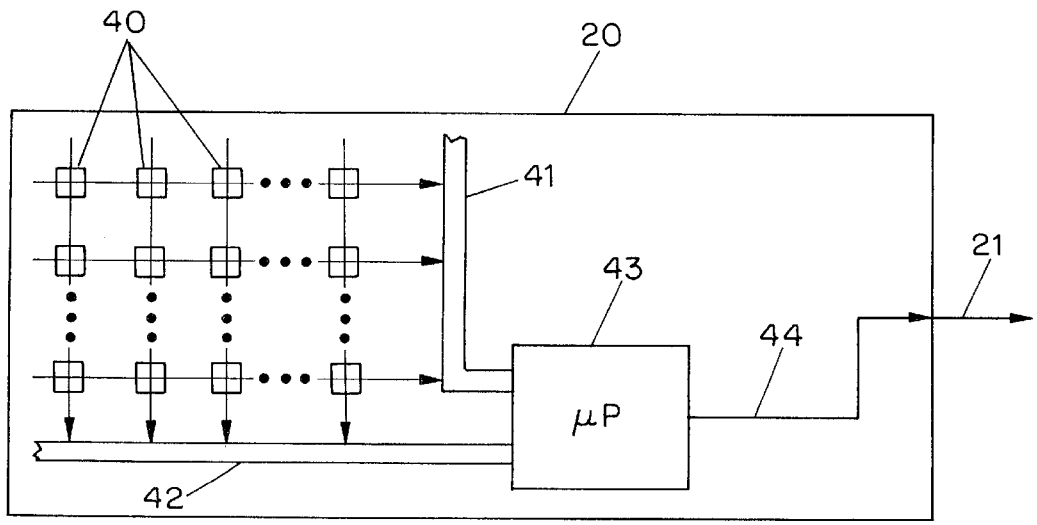
FIG. 3 is a functional block diagram of the keyboard 20 of FIG. 1.

A typical prior art computer and keyboard configuration is shown in FIGS. 1, 2, and 3. FIG. 1 is a functional block diagram of a keyboard 20 and computer system according to the prior art. Keyboard 20 generates scancodes indicative of key presses. (Those skilled in the art will appreciate that in typical computer and keyboard configurations the scancodes are indicative of both key presses and key releases; for clarity the remaining discussion omits mention of the scancodes indicative of key releases.) The scancodes are transmitted in serial fashion along coiled cord 21 which is plugged into computer 23. The scancodes are received at keyboard interface 22, which generates an interrupt to the processor 24. In response to the interrupt the processor 24 reads the scancode from the keyboard interface 22. Computer 23 has numerous other functional elements not shown in FIG. 1, and the functional elements include a piezoelectric beeper 25 and a display 26 which is typically a cathode-ray tube or a liquid crystal display.

FIG. 2 is a data flow diagram showing the flow of keystroke information in the prior art system of FIG. 1. As is well known to those skilled in the art, the stored program executed by processor 24 includes BIOS and DOS and the application being executed; scancode information is processed first by the BIOS and DOS as depicted in box 30, and depending on the nature of the keyboard activity ASCII values are made available to the application 31.

FIG. 3 is a functional block diagram of the keyboard 20 of FIG. 1. Individual keys 40 are shown, which bear characters such as letters, numerals, and other symbols, not shown in FIG. 3. Electrically the keys are in a matrix, row information of which is collected on bus 41 and column information of which is collected on bus 42. Keyboard microprocessor 43 receives the information, debounces the key events, translates the events into scancodes, and makes the scancodes available via internal serial line 44 to external serial line 21.

Figure 4:
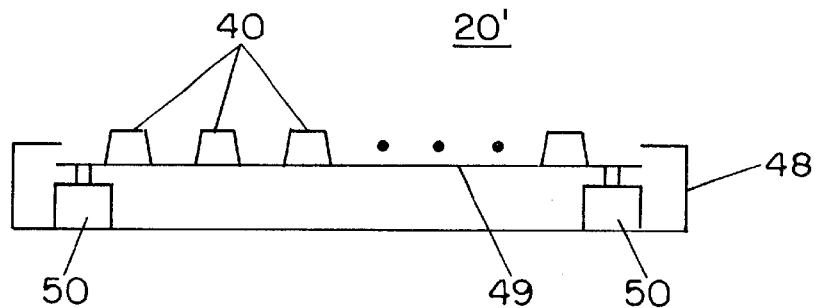
FIG. 4 is a cross section of a keyboard 20' according to the invention.

In one embodiment of the invention, a keyboard 20' is substituted for prior art keyboard 20; keyboard 20' according to the invention is shown in cross section in FIG. 4. Keys 40 may be seen, resting on a printed circuit board 49, which in turn rests on strain gauges 50, which are pressure transducers or sensors. One embodiment employs four strain gauges, with analog circuitry which combines the four outputs to yield a reliable single pressure figure. Another embodiment uses lever arms in a manner well known to those skilled in the art (e.g. in bathroom scales) to collect data from four corners and concentrates it in a single point for measurement by a single strain gauge. Yet other well- known scale mechanisms use from two to four transducers. It is also possible to use as many sensors as there are keys 40.

Those skilled in the art will appreciate that while it would be most desirable to have a hardware configuration giving uniform sensitivity across all keys 40, it is also possible, through post- processing in software, to adjust readings up or down based on the particular key 40 that was pressed. This would eliminate inaccuracies resulting from varying distances between key and sensors, varying keyboard flexibility, and the like.

The assembly is within housing 48. The internal configuration of the keyboard 20' is shown in part in FIG. 5, which shows differences from the prior art internal configuration shown in FIG. 3. Strain gauges 50 provide data to processor 43', which runs a stored program receiving the data and manipulating it as described below. Three embodiments of the keyboard 20' may be discussed with reference to FIG. 5, differing in what is done with data indicative of the pressure with which keys are being pressed. In one embodiment, pressure information is interleaved with scancode information indicative of key closures (and releases) and is transmitted via line 44 to be received at points external to the keyboard 20'. In a second embodiment, pressure information is transmitted via optional line 93 to be received at points external to the keyboard 20'. In a third embodiment, pressure information is compared with a predetermined threshold according to the stored program of the processor 43', and if the threshold is exceeded this event is announced by an optional annunciator 51. The annunciation could be a sound or a light. Additionally, the annunciation could be enhanced by suppression of the scancode that would normally have been sent via line 44. One approach could be automatically voiding any keystroke in excess of a second predetermined threshold, such as 250 grams.

Figure 6:
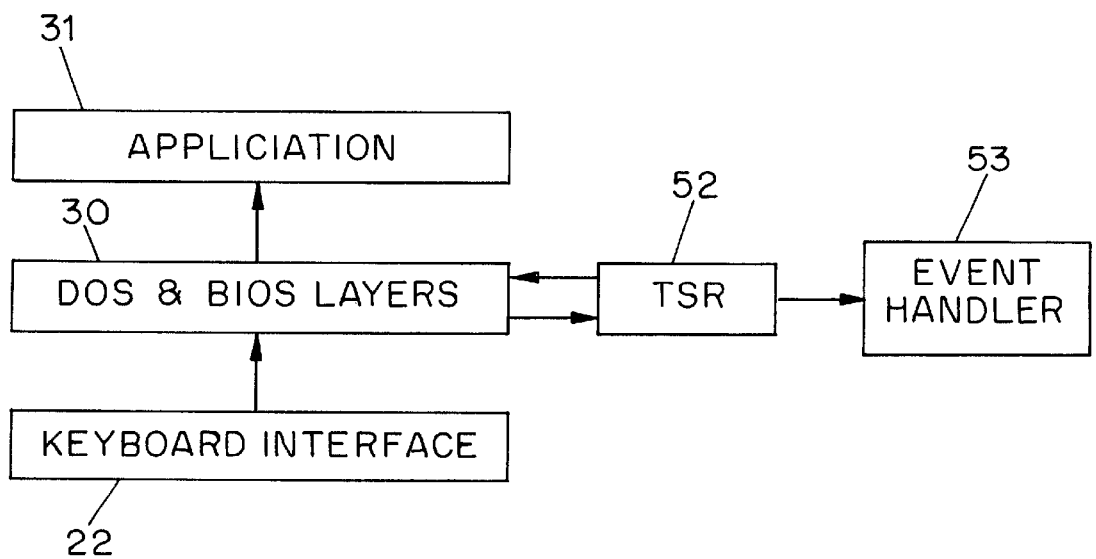
FIG. 6 is a data flow diagram showing the flow of keystroke information in the system according to the invention, including TSR 52.
Figure 9:
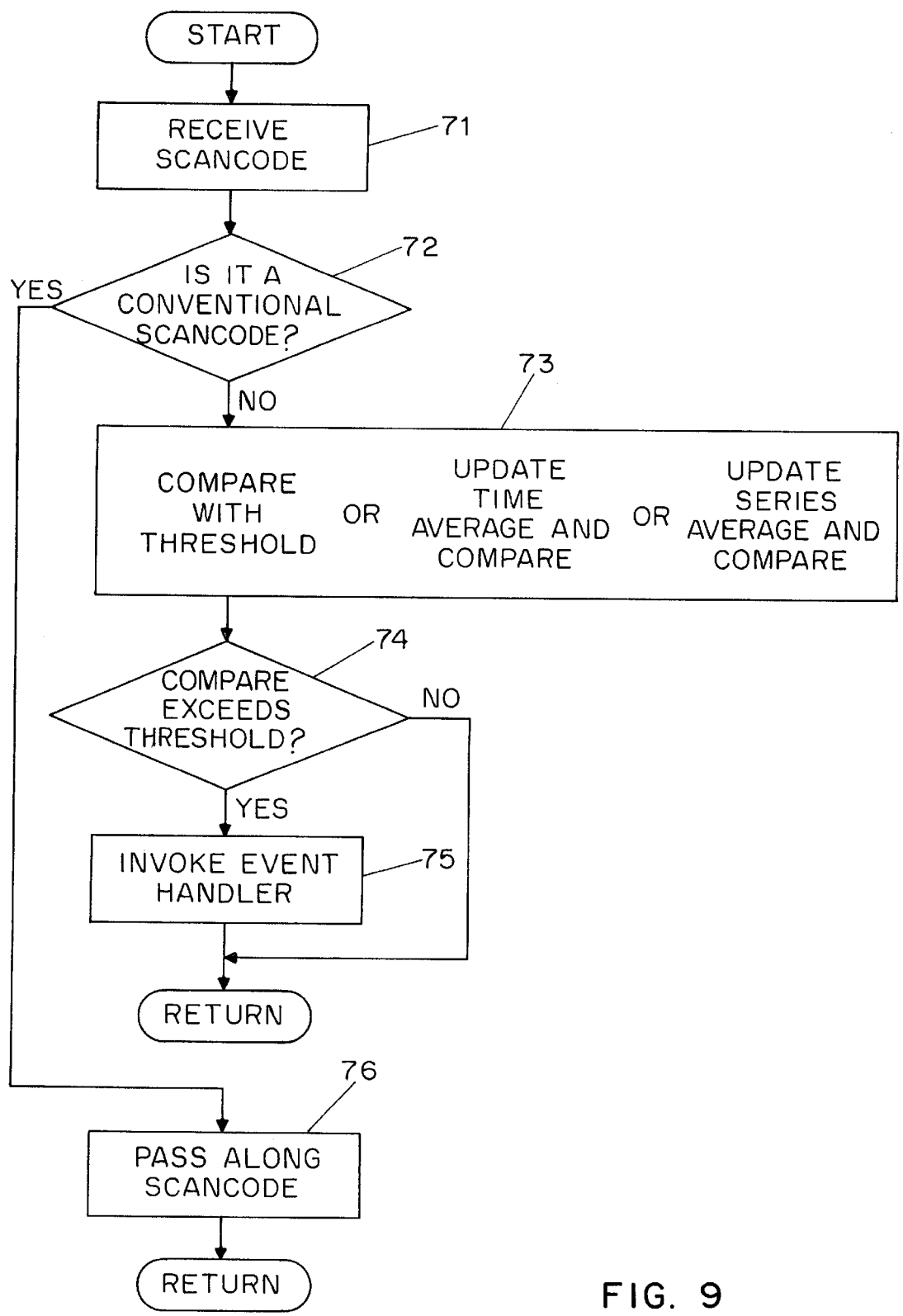
FIG. 9 is a flowchart for the TSR 52.

The first embodiment assumes that software has been installed in the computer to receive the pressure information; such software, typically a TSR (terminate-and-stay-resident routine), is discussed below in connection with FIGS. 6 and 9. Such an arrangement permits use of a standard, unmodified, personal computer and standard, unmodified software applications.

The second embodiment assumes that specialized hardware is employed to receive pressure information from one or more keyboards 20', as discussed below in connection with FIGS. 11 and 12.

The third embodiment makes no assumption about hardware or software external to the keyboard 20'. Such an arrangement permits use of a standard, unmodified, personal computer and standard, unmodified software applications.

The comparison of pressure information with a predetermined threshold may be done in any of several ways. A simple way is to compare each individual pressure reading with the threshold and to initiate the event handling each time it is exceeded. Another way is to time-average all the pressure readings over an interval such as the last three minutes, recalculating the average continuously. If the average exceeds the threshold the event handler is invoked. Yet another way is to average the pressure readings for some predetermined number of preceding keystrokes, recalculating the average with each new keystroke. If the average exceeds the threshold the event handler is invoked. Those skilled in the art will readily appreciate that many other ways may be devised that in no way depart from the invention.

Those skilled in the art will appreciate that the pressure detected by the gauges 50, in absolute terms, includes the weight of the keys 40 and the printed circuit board 49, so that a "zeroing" analogous to that of a commercial scale is performed. Further changes in the readings of the gauges, especially those changes that correlate in time with received scancodes, are indicative of pressure on keys. Depending on the work environment it may prove beneficial to "re-zero" the gauges from time to time during the user session, especially if the user/keyboard geometry is changed during the session.

As mentioned above, one of the ways in which pressure information is collected and analyzed in accordance with the invention is with the use of a TSR. FIG. 6 is a data flow diagram analogous to that of FIG. 2, showing the flow of keystroke information in the system according to the invention. Interleaved scancode and pressure information is provided by the keyboard 20' (not shown in FIG. 6) to the keyboard interface 22 of the computer 23. Interrupts prompt attention in software to the arrival of each item of data at the keyboard interface 22, and the BIOS and DOS layers 30 receive the data. The software environment of the computer 23, when modified by installation of TSR 52 according to the invention, permits the TSR 52 to inspect each arriving item of data according to scancode "hooks" well known to those skilled in the art. The TSR 52 inspects each item of data, and those that are scancodes are passed along to the application 31. Those items of data that are not scancodes are pressure data. The pressure data is compared with a predetermined threshold and, in the event the data exceed the threshold, event handler 53 is invoked.

Just as was discussed above with respect to annunciator 51 of FIG. 5, any of numerous approaches may be taken in analyzing the pressure data. The approaches may include time-averaging, series averaging, or comparison of individual data items.

It will be appreciated that the feedback provided to the user by the event handler 53 may be aural in nature, e.g. by beeper 25, or may be provided on display 26. Yet another form of feedback can be the suppression of the scancode associated with the high pressure, so that the application 31 never learns the key was even pressed. In a networked environment the event may be communicated to a central data-gathering location.

Figure 7:
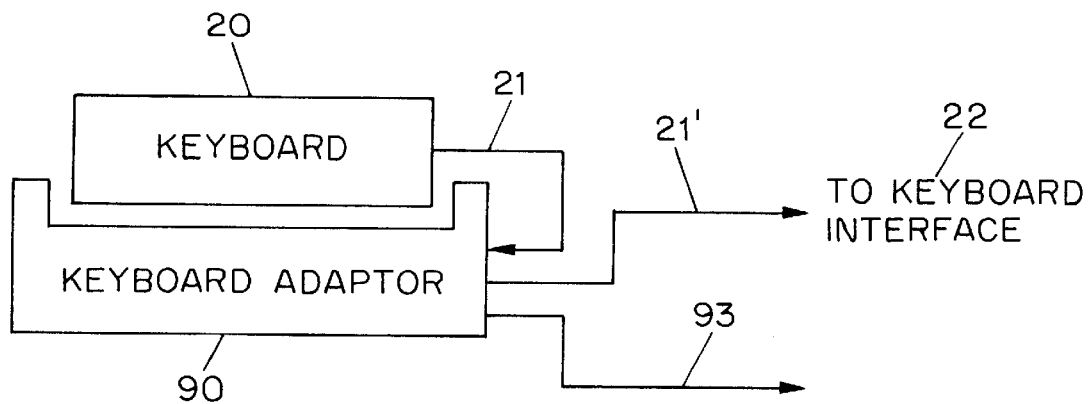
FIG. 7 is a functional block diagram showing a prior art keyboard 20 together with a keyboard adaptor 90 according to the invention.

FIG. 7 is a functional block diagram showing a prior art keyboard 20 together with a keyboard adaptor 90 according to the invention. This is of particular utility in the case where it is desired to use a keyboard 20 according to the prior art. This might arise, for example, where the keyboard 20 has custom keycaps or an unorthodox layout. As will be discussed in greater detail below, the keyboard adaptor 90 gives rise to capabilities like those of the modified keyboard 20', discussed above in connection with FIG. 5, including an optional output 93 and an internal annunciator 51, not shown for clarity in FIG. 7.

Figure 8:
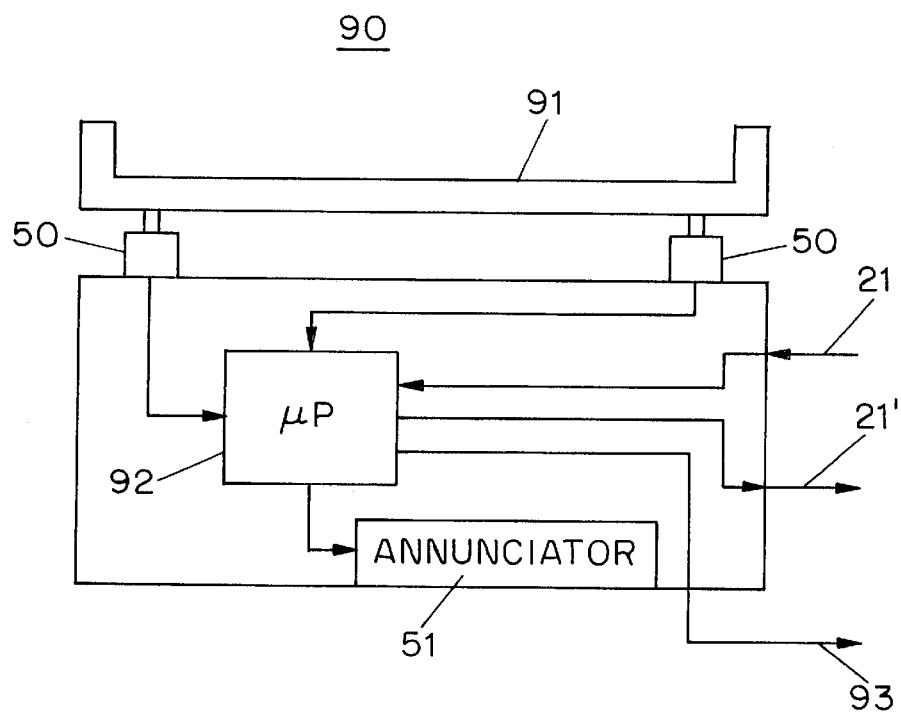
FIG. 8 is a functional block diagram of the keyboard adaptor 90.

FIG. 8 is a functional block diagram of the keyboard adaptor 90. Strain gauges 50, like those shown in FIG. 4, measure the weight upon surface 91 which receives keyboard 20, not shown in FIG. 8. Microprocessor 92 is provided within the adaptor. It receives scancodes via line 21, and controls output 21' and optional outputs 93 and 51 as described above in connection with FIG. 5. Those skilled in the art will readily appreciate that the combination shown in FIG. 7, namely an unmodified keyboard 20 together with the keyboard adaptor 90, is thus largely functionally equivalent to the modified keyboard 20' discussed above in connection with FIGS. 4 and 5.

As was mentioned above, one way that pressure information may be received and analyzed is by a TSR 52. FIG. 9 is a flowchart for the TSR 52. When the interrupt arrives from the keyboard interface 22 (see FIG. 1) the software services the interrupt, interrupting the execution of the application 31 (see FIGS. 2 and 6) in a manner well known in the prior art. The BIOS and DOS service the interrupt, but before taking action regarding the scancode they permit control to pass to any TSR (of which there may be several, e.g. SideKick by Borland) that has placed itself in the chain of TSR's intercepting the scancode interrupt. The TSR 52 of the invention will have been installed in the computer 23 as part of modifying the computer 23 to embody the invention. TSR 52 starts at box 71 with reception of the scancode from the hardware keyboard interface 22. At box 72, a test is made to determine whether the scancode is pressure data (derived from pressure sensors 50) or is a "conventional" scancode, indicative of a key 40 being pressed (or released). If the scancode is pressure data, then computations are performed as shown in box 73. As discussed above, the computation may be time-averaging, series averaging, or comparison of individual data items.

In box 74 a test is made to determine if the pressure threshold has been exceeded. If so, at box 75 the event handler is invoked as discussed above in connection with box 53 of FIG. 6, and execution proceeds with a return to normal BIOS and DOS handling as if no scancode had ever arrived.

In connection with box 72 the other outcome of the test is that the received data is not pressure data, in which case it is assumed to be a scancode as would be generated by an unmodified keyboard 20. In box 76 the scancode is passed along to BIOS and DOS layer 30 (see FIGS. 2 and 6) and is made available to the application as if the TSR 52 had never been invoked or even installed.

Figure 10:
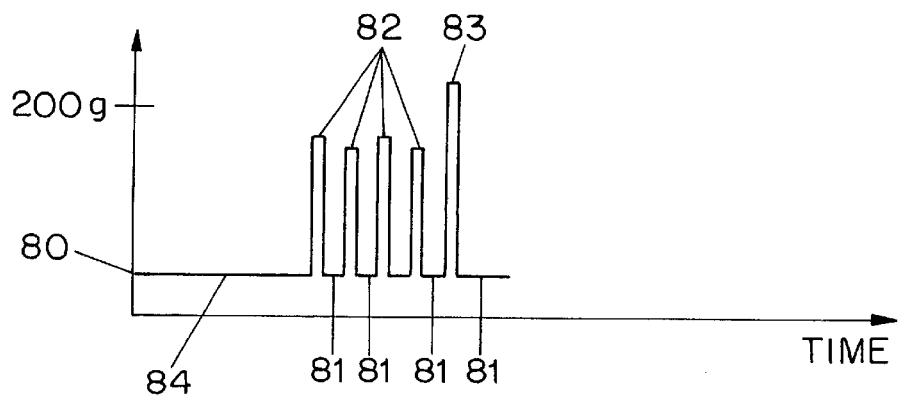
FIG. 10 is a graph showing keyboard pressure readings over time.

FIG. 10 is a graph showing keyboard pressure readings over time from gauges 50. Spikes 82, 83 represent pressure values due to keystrokes at keys 40. Spike 83 is past the 200-gram threshold and so may be annunciated to the user depending on the type of analysis employed. Pressure readings at times 81, uncorrelated to any key closure scancodes, are taken to represent zero, that is, no weight on any of the keys 40. These average to a pressure reading at 80. As discussed above, the reading when the system is first powered may be taken as zero, or the system may optionally keep a running zero level by averaging the readings at times 81.

Figure 11:
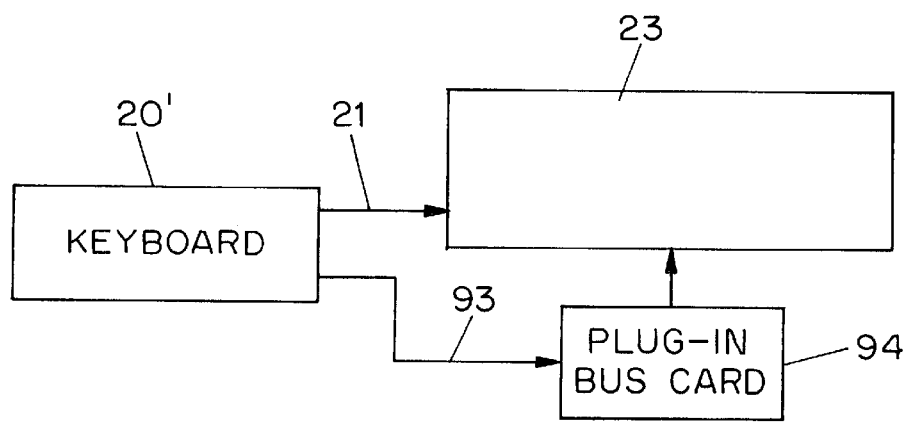
FIG. 11 is a functional block diagram of an alternative embodiment of the system according to the invention.
Figure 12:
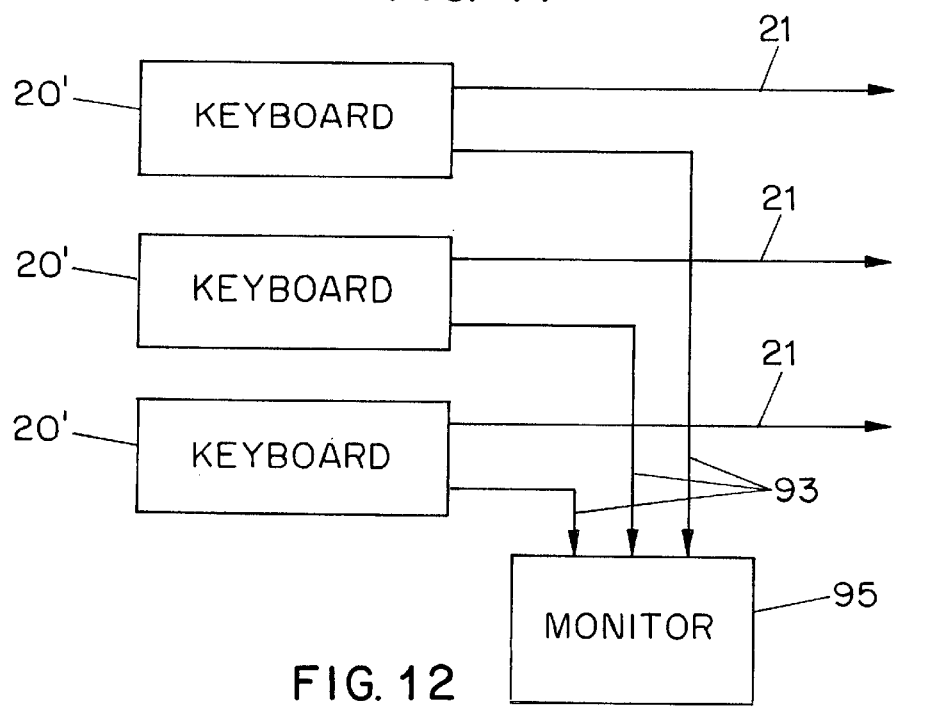
FIG. 12 is a functional block diagram of another alternative embodiment of the system according to the invention.

FIGS. 11 and 12 show two hardware approaches that may be taken if the optional pressure data line 93 is employed. In FIG. 11 a plug-in card 94 is plugged into an expansion slot of the computer 23. Software in the computer 23 receives pressure data from the card 94 via line 93. The software may include time-averaging, series averaging, or comparison of individual data items, as discussed above, or may pass along the data on a network. In FIG. 12 a monitoring computer 95 receives the several pressure data lines 93. This may be particularly useful in environments (e.g. telephone operator service positions) where the keyboards are hard-wired to specialized computer systems that cannot easily be modified for example to accept TSRs 52. The monitor 95 compares the pressure data with threshold values as discussed above. The resulting data could optionally be provided only to supervisory personnel. After initial adjustment the thresholds could be readjusted automatically as each operator learns good technique. The software in the monitor 95 could also graph the history of each user's keystroke pressure for use in measuring progress. This information could assist supervisory personnel in deciding which operators can safely continue operating a keyboard. This information can also provide objective legal grounds for reassigning or otherwise taking management action regarding a worker prior to injury.

As mentioned above, in another embodiment of the invention, the system detects and annunciates the event of any single keystroke being made at a level higher than a predetermined threshold. Alternatively, the system is set up to define distinct physical regions of the keyboard, and compiles key pressure information with respect to the regions. In the event that there has been too much pressure over a predetermined interval with respect to a region, that event is annunciated. The defined regions may, for example, be divided according to which hand is used or according to which finger is used. In keyboards having a separate numeric keypad, the system may compile information separately with respect to characters typed at the numeric keypad. Those skilled in the art will have no difficulty devising other groupings, easily realized with suitable changes in the software, which may give rise to helpful and meaningful data. All such groupings fall within the scope of the invention.

The system may also be set up to compile key pressure information with respect to characteristics of characters being typed. For example, information may be compiled regarding all capital (upper-case) letters typed, or regarding all numerals typed. In all these cases under program control it is possible to annunciate events such as the use of excessive pressure, or to maintain statistics for use in evaluating the progress of a user in modifying his or her typing habits. Just as with the regional groupings, those skilled in the art will have no difficulty devising other characteristics, easily realized with suitable changes in the software, which may give rise to helpful and meaningful data, and none of which would deviate from the scope of the invention. Those could include typing text sharing other characteristics or sharing other qualities such as particular subject matter.

Finally, those skilled in the art will have no difficulty identifying other ways of accumulating data which will be helpful or crucial in administering a workplace where much typing is performed. It is speculated that peak times may be seen with respect to particular typists (or with respect to groups of typists) for particular times of day or particular days of the week, or after particularly long days of work. The system according to the invention would be well suited to accumulate data in any of these ways.

Figure 13A:
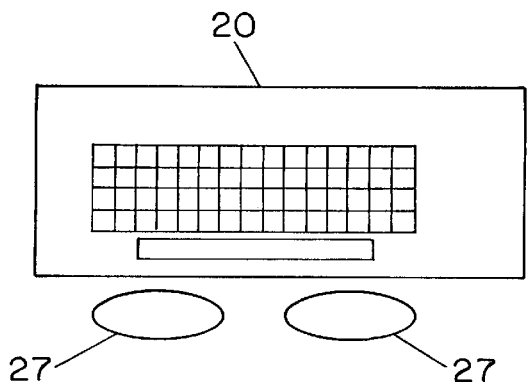
FIG. 13A shows wrist support pads in relation to a keyboard.

As mentioned above it is known, for example, to provide wrist support pads in front of the keyboard, for example in front of the space bar. This may be seen, for example, in FIG. 13A, where wrist support pads 27 are shown in front of keyboard 20. In an embodiment of the invention, pressure detected at one or both of pads 27 is monitored and the pressure readings used to detect and annunciate poor typing or keyboarding habits.

Figure 13B:
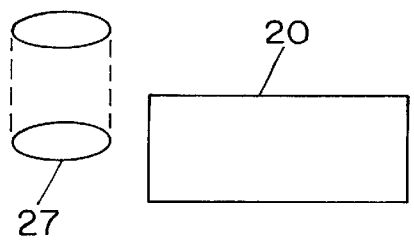
FIG. 13B shows the wrist support pads of FIG. 13A in side view.

FIG. 13B shows the wrist support pad or pads 27 in side view. The support 27 pad may be shaped with a hole through which the operator places the hand, which is thus useful for teaching proper technique and assisting a user in avoiding injury.

Figure 5:
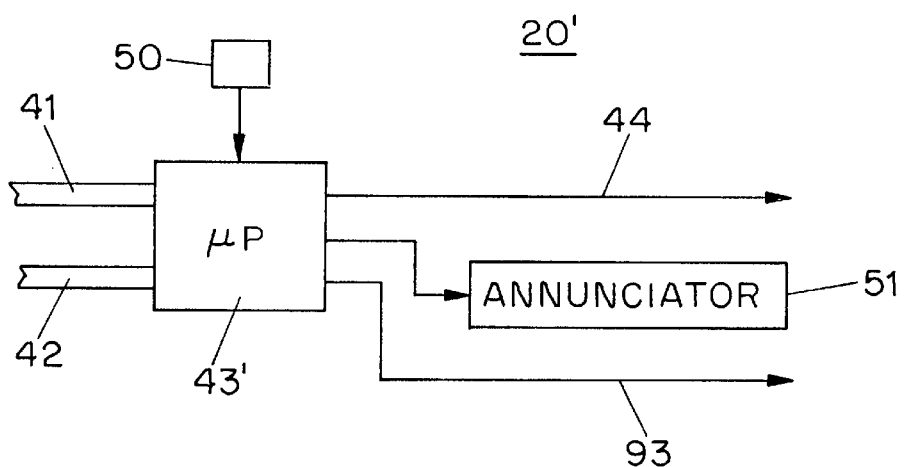
FIG. 5 is a functional block diagram of a portion of a keyboard 20' according to the invention.
Figure 14:
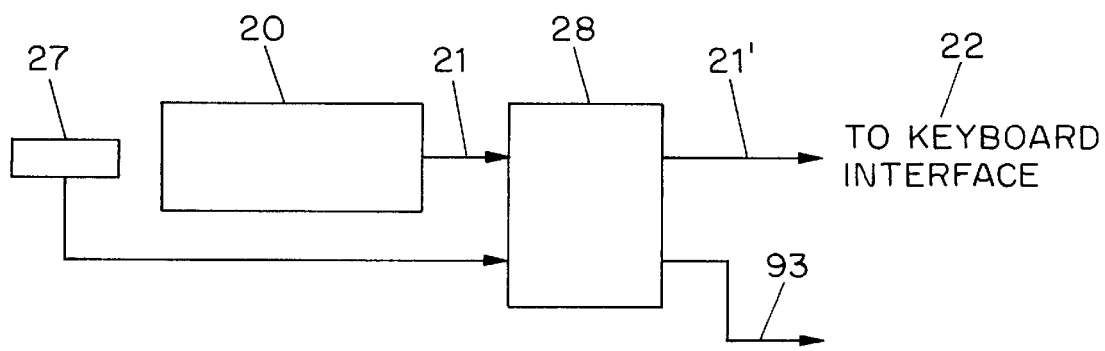
FIG. 14 shows a configuration of the system of FIG. 13 employable with a standard keyboard.
Figure 15:
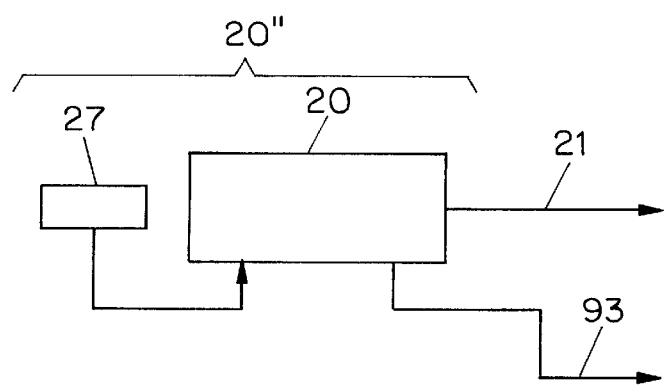
FIG. 15 shows a configuration of the system of FIG. 13 in which a specialized keyboard is used.

Those skilled in the art will appreciate that, much as with the embodiments of FIGS. 5 and 7, the wrist support pad monitoring apparatus may be employed with a standard, off-the-shelf keyboard or with a specialized keyboard that has been optimized to provide the monitoring capability. FIG. 14 shows the arrangement to be used with standard keyboard 20. Monitoring apparatus 28 receives both pressure data from pads 27 and keyboard information via line 21 from keyboard 20. The keyboard information can be mere scancode or keystroke data, in which case the condition monitored is the event of a key being pressed at a time when there is no pressure on a wrist pad. If the keyboard is also providing pressure data (either from built-in sensors 50 such as in FIG. 5 or from an external sensor adaptor 90 such as in FIG. 7) then monitoring apparatus 28 can also take the pressure information into account. If the individual or averaged pressures at keys fall into predetermined relation with individual or averaged pressures at the wrist pads, then the condition is annunciated. In the simplest case, the predetermined relation is that the key pressure exceeds that on the wrist pads.

In any of these embodiments the simplest monitoring activity is to look for single coincidences of a key being pressed at a time when there is too little pressure detected at the wrist pad. As with the systems of FIGS. 5 and 7 above, however, in software it is a straightforward matter to identify trends of interest, such as a predetermined number or duration of such coincidences. Those skilled in the art will appreciate that when the event being detected is, for example, the event of a key being actuated in the absence of sensed pressure at the pad support, the system may just as well detect the complete absence of pressure or the pressure falling below a predetermined threshold.

Those skilled in the art will of course have no difficulty practicing the invention by means of numerous embodiments differing from those shown here in obvious ways. For example, that which is described herein as performed by general purpose processors executing stored programs could just as well be performed by random logic or application specific integrated circuits. It will also be appreciated that while the terminology employed herein has made repeated reference to the physical pressing of a movable key, the invention is not so narrowly limited, but could be applied to keys that do not move (or that do not move appreciably). Pressing of a key, in this context, can mean physical vertical movement or can mean any of various other ways to detect key selections, including capacitive contact, resistive contact, or localized doppler-shift detection of finger motion. Those and all obvious modifications and improvements are intended to be covered by the claims.

I claim:

1. A keyboard apparatus comprising:

a keyboard with depressible keys;

means mechanically engaged with the keys and responsive to the pressing of the keys for generating electrical key signals indicative thereof;

output means conveying the key signals externally from the keyboard;

pressure sensing means mechanically engaged with the keys and responsive to pressure upon particular ones of the keys for generating electrical pressure signals indicative of the pressure on the particular ones of the keys; and alarm means responsive to the pressure signals being above a predetermined threshold for generating an alarm signal, said alarm means further comprising a region-averaging means responsive to the pressure signals for averaging the signals generated with respect to keys in a region of the keyboard, said region defined as the set of keys pressed by a particular finger of a user.

2. The keyboard apparatus of claim 1 which the predetermined threshold is selected from the range of 180 to 300 grams.

3. A keyboard apparatus comprising:

a keyboard with depressible keys;

means mechanically engaged with the keys and responsive to the pressing of the keys for generating electrical key signals indicative thereof;

output means conveying the key signals externally from the keyboard;

pressure sensing means mechanically engaged with the keys and responsive to pressure upon particular ones of the keys for generating electrical pressure signals indicative of the pressure on the particular ones of the keys; and alarm means responsive to the pressure signals being above a predetermined threshold for generating an alarm signal, said alarm means further comprising a region-averaging means responsive to the pressure signals for averaging the signals generated with respect to keys in a region of the keyboard, said region defined as the set of keys pressed by a particular hand of a user.

4. The keyboard apparatus of claim 3 in which the predetermined threshold is selected from the range of 180 to 300 grams.

5. A keyboard apparatus comprising:

a keyboard with depressible keys;

means mechanically engaged with the keys and responsive to the pressing of the keys for generating electrical key signals indicative thereof;

output means conveying the key signals externally from the keyboard;

pressure sensing means mechanically engaged with the keys and responsive to pressure upon particular ones of the keys for generating electrical pressure signals indicative of the pressure on the particular ones of the keys;

alarm means responsive to the pressure signals being above a predetermined threshold for generating an alarm signal, said alarm means further comprising averaging means responsive to the pressure signals for averaging the signals generated with respect to characters sharing a characteristic.

6. The keyboard apparatus of claim 5 wherein the averaging means averages the signals with respect to characters sharing the characteristic of being capital letters.

7. The keyboard apparatus of claim 6 in which the predetermined threshold is selected from the range of 180 to 300 grams.

8. The keyboard apparatus of claim 5 wherein the averaging means averages the signals with respect to characters sharing the characteristic of being numerals.

9. The keyboard apparatus of claim 8 in which the predetermined threshold is selected from the range of 180 to 300 grams.

10. The keyboard apparatus of claim 5 in which the predetermined threshold is selected from the range of 180 to 300 grams.

11. A computer apparatus comprising keyboard apparatus and annunciation apparatus, the keyboard apparatus comprising:

a keyboard with depressible keys;

means mechanically engaged with the keys and responsive to the pressing of the keys for generating electrical key signals indicative thereof;

pressure sensing means mechanically engaged with the keys and responsive to pressure upon particular ones of the keys for generating electrical pressure signals indicative of the pressure on the particular ones of the keys; and output means conveying the key signals and the pressure signals externally from the keyboard;

the annunciation apparatus comprising:

a processor;

message means audiovisually perceptible to a user and controlled by the processor; and input means operatively coupled with the processor for receiving the key signals and the pressure signals;

wherein the processor is further characterized in that the processor further comprises means for comparing the pressure signals with a predetermined threshold and for generating a message at the message means when the pressure signals exceed the predetermined threshold, said means for comparing further comprising region-averaging means responsive to the pressure signals for averaging the signals generated with respect to keys in a region of the keyboard, said region defined as the set of keys pressed by a particular finger of a user.

12. The computer apparatus of claim 11 in which the predetermined threshold is selected from the range of 180 to 300 grams.

13. A computer apparatus comprising keyboard apparatus and annunciation apparatus, the keyboard apparatus comprising:

a keyboard with depressible keys;

means mechanically engaged with the keys and responsive to the pressing of the keys for generating electrical key signals indicative thereof;

pressure sensing means mechanically engaged with the keys and responsive to pressure upon particular ones of the keys for generating electrical pressure signals indicative of the pressure on the particular ones of the keys; and output means conveying the key signals and the pressure signals externally from the keyboard;

the annunciation apparatus comprising:

a processor;

message means audiovisually perceptible to a user and controlled by the processor; and input means operatively coupled with the process or for receiving the key signals and the pressure signals;

wherein the processor is further characterized in that the processor further comprises means for comparing the pressure signals with a predetermined threshold and for generating a message at the message means when the pressure signals exceed the predetermined threshold, said means for comparing further comprising region-averaging means responsive to the pressure signals for averaging the signals generated with respect to keys in a region of the keyboard, said region defined as the set of keys pressed by a particular hand of a user.

14. The computer apparatus of claim 13 in which the predetermined threshold is selected from the range of 180 to 300 grams.

15. A computer apparatus comprising keyboard apparatus and annunciation apparatus, the keyboard apparatus comprising:

a keyboard with depressible keys;

means mechanically engaged with the keys and responsive to the pressing of the keys for generating electrical key signals indicative thereof;

pressure sensing means mechanically engaged with the keys and responsive to pressure upon particular ones of the keys for generating electrical pressure signals indicative of the pressure on the particular ones of the keys; and output means conveying the key signals and the pressure signals externally from the keyboard;

the annunciation apparatus comprising:

a processor;

message means audiovisually perceptible to a user and controlled by the processor; and input means operatively coupled with the processor for receiving the key signals and the pressure signals;

wherein the processor is further characterized in that the processor further comprises means for comparing the pressure signals with a predetermined threshold and for generating a message at the message means when the pressure signals exceed the predetermined threshold, said means for comparing further comprising averaging means responsive to the pressure signals for averaging the signals generated with respect to characters sharing a characteristic.

16. The computer apparatus of claim 15 wherein the averaging means averages the signals with respect to characters sharing the characteristic of being capital letters.

17. The computer apparatus of claim 16 in which the predetermined threshold is selected from the range of 180 to 300 grams.

18. The computer apparatus of claim 15 wherein the averaging means averages the signals with respect to characters sharing the characteristic of being numerals.

19. The computer apparatus of claim 18 in which the predetermined threshold is selected from the range of 180 to 300 grams.

20. The computer apparatus of claim 15 in which the predetermined threshold is selected from the range of 180 to 300 grams.

21. A method for use with a keyboard apparatus of the type having a keyboard with depressible keys, means mechanically engaged with the keys and responsive to the pressing of the keys for generating electrical key signals indicative thereof, output means conveying the key signals externally from the keyboard, pressure sensing means mechanically engaged with the keys and responsive to pressure upon particular ones of the keys for generating electrical pressure signals indicative of pressure on the particular ones of the keys, and alarm means, the method comprising:

monitoring the pressure signals by averaging the signals generated with respect to keys in a region of the keyboard, said region defined as the set of keys pressed by a particular finger of a user, and generating an alarm signal if the average of the pressure signals are above a predetermined threshold.

22. The method of claim 21 in which the predetermined threshold is selected from the range of 180 to 300 grams.

23. A method for use with a keyboard apparatus of the type having a keyboard with depressible keys, means mechanically engaged with the keys and responsive to the pressing of the keys for generating electrical key signals indicative thereof, output means conveying the key signals externally from the keyboard, pressure sensing means mechanically engaged with the keys and responsive to pressure upon particular ones of the keys for generating electrical pressure signals indicative of pressure on the particular ones of the keys, and alarm means, the method comprising:

monitoring the pressure signals by averaging the signals generated with respect to keys in a region of the keyboard, said region defined as the set of keys pressed by a particular hand of a user, and generating an alarm signal if the average of the pressure signals are above a predetermined threshold.

24. The method of claim 23 in which the predetermined threshold is selected from the range of 180 to 300 grams.

25. A method for use with a keyboard apparatus of the type having a keyboard with depressible keys, means mechanically engaged with the keys and responsive to the pressing of the keys for generating electrical key signals indicative thereof, output means conveying the key signals externally from the keyboard, pressure sensing means mechanically engaged with the keys and responsive to pressure upon particular ones of the keys for generating electrical pressure signals indicative of pressure on the particular ones of the keys, and alarm means, the method comprising:

monitoring the pressure signals by averaging the signals generated with respect to characters sharing a characteristic, and generating an alarm signal if the average of the pressure signals are above a predetermined threshold.

26. The method of claim 25, wherein the averaging step further comprises averaging the signals with respect to characters sharing the characteristic of being capital letters.

27. The method of claim 26 in which the predetermined threshold is selected from the range of 180 to 300 grams.

28. The method of claim 25 wherein the averaging step further comprises averaging the signals with respect to characters sharing the characteristic of being numerals.

29. The method of claim 28 in which the predetermined threshold is selected from the range of 180 to 300 grams.

30. The method of claim 25 in which the predetermined threshold is selected from the range of 180 to 300 grams.

31. A method for use with computer apparatus comprising keyboard apparatus and annunciation apparatus, the keyboard apparatus comprising a keyboard with depressible keys, means mechanically engaged with the keys and responsive to the pressing of the keys for generating electrical key signals indicative thereof, pressure sensing means mechanically engaged with the keys and responsive to pressure upon particular ones of the keys for generating electrical pressure signals indicative of the pressure on the particular ones of the keys, and output means conveying the key signals and the pressure signals externally from the keyboard, the annunciation apparatus comprising a processor, message means audiovisually perceptible to a user and controlled by the processor, and input means operatively coupled with the processor for receiving the key signals and the pressure signals; the method comprising the steps of:

comparing the pressure signals with a predetermined threshold by averaging the signals generated with respect to keys in a region of the keyboard, said region defined as the set of keys pressed by a particular finger of a user, generating an alarm if the average is above the predetermined threshold, and generating a message at the message means when the pressure signals exceed the predetermined threshold.

32. The method of claim 31 in which the predetermined threshold is selected from the range of 180 to 300 grams.

33. A method for use with computer apparatus comprising keyboard apparatus and annunciation apparatus, the keyboard apparatus comprising a keyboard with depressible keys, means mechanically engaged with the keys and responsive to the pressing of the keys for generating electrical key signals indicative thereof, pressure sensing means mechanically engaged with the keys and responsive to pressure upon particular ones of the keys for generating electrical pressure signals indicative of the pressure on the particular ones of the keys, and output means conveying the key signals and the pressure signals externally from the keyboard, the annunciation apparatus comprising a processor, message means audiovisually perceptible to a user and controlled by the processor, and input means operatively coupled with the processor for receiving the key signals and the pressure signals; the method comprising the steps of:

comparing the pressure signals with a predetermined threshold by averaging the signals generated with respect to keys in a region of the keyboard, said region defined as the set of keys pressed by a particular hand of a user, generating an alarm if the average is above the predetermined threshold, and generating a message at the message means when the pressure signals exceed the predetermined threshold.

34. The method of claim 33 in which the predetermined threshold is selected from the range of 180 to 300 grams.

35. A method for use with computer apparatus comprising keyboard apparatus and annunciation apparatus, the keyboard apparatus comprising a keyboard with depressible keys, means mechanically engaged with the keys and responsive to the pressing of the keys for generating electrical key signals indicative thereof, pressure sensing means mechanically engaged with the keys and responsive to pressure upon particular ones of the keys for generating electrical pressure signals indicative of the pressure on the particular ones of the keys, and output means conveying the key signals and the pressure signals externally from the keyboard, the annunciation apparatus comprising a processor, message means audiovisually perceptible to a user and controlled by the processor, and input means operatively coupled with the processor for receiving the key signals and the pressure signals; the method comprising the steps of:

comparing the pressure signals with a predetermined threshold by averaging the signals generated with respect to characters sharing a characteristic, generating an alarm if the average is above the predetermined threshold, and generating a message at the message means when the pressure signals exceed the predetermined threshold.

36. The method of claim 35 wherein the averaging step further comprises averaging the signals with respect to characters sharing the characteristic of being capital letters.

37. The method of claim 36 in which the predetermined threshold is selected from the range of 180 to 300 grams.

38. The method of claim 35 wherein the averaging step further comprises averaging the signals with respect to characters sharing the characteristic of being numerals.

39. The method of claim 38 in which the predetermined threshold is selected from the range of 180 to 300 grams.

40. The method of claim 35 in which the predetermined threshold is selected from the range of 180 to 300 grams.

* * * * *